United States Patent [19]

Grandy

[11] Patent Number: 4,767,168

[45] Date of Patent: Aug. 30, 1988

[54] HYBRID CONNECTOR CABLE SYSTEM

[75] Inventor: Mark E. Grandy, Port Huron, Mich.

[73] Assignee: Prestolite Wire Corporation, Farmington Hills, Mich.

[21] Appl. No.: 946,308

[22] Filed: Dec. 24, 1986

[51] Int. Cl.$^4$ ................................................ G02B 6/36
[52] U.S. Cl. ................................. 350/96.2; 350/96.23
[58] Field of Search ................ 350/96.16, 96.20, 96.23

[56] References Cited

U.S. PATENT DOCUMENTS 4,595,839  6/1986  Braun et al. .................... 350/96.2 X

FOREIGN PATENT DOCUMENTS 2112544  7/1983  United Kingdom ............... 350/96.2

*Primary Examiner*—James B. Mullins
*Attorney, Agent, or Firm*—James R. Ignatowski; Remy J. VanOphem

[57] ABSTRACT

A hybrid cable connector system for transmitting electrical power and multiplexed information signals between remotely located devices. The hybrid cable connector system has a plurality of serially connected connector cables. Each of the connector cables have at least one metal conductor for transmitting electrical power and at least one optical fiber for transmitting the multiplexed information signals. The connector at one end of each connector cable has a light source for converting electrical signals to light signals which are transmitted by the optical fiber to the connector at the other end of the connector cable. The connector at the other end of the connector cable has a photodetector for converting light signals back to electrical signals. The connections at both ends of the connector cable are totally electrical. In the preferred embodiment, the connector cable has two optical fibers, each having a light source and a photodetector disposed at its opposite ends permitting information signals to be transmitted through the connector cable in both directions. The cable connector system may include interface modules connected between the connector cables and the remotely located devices. Each interface module has a control module for extracting the desired information signal from the multiplexed signals being transmitted by the hybrid cable connector system.

11 Claims, 2 Drawing Sheets

HYBRID CONNECTOR CABLE SYSTEM

BACKGROUND OF THE INVENTION

1. Field of the Invention

The invention is related to the field of connector cable systems and in particular to a hybrid connector cable system in which the connector cable includes a metallic conductor for transmitting electrical power and at least one optical fiber for transmitting information signals.

2. Description of the Prior Art

The use of fiber optics for transmitting information between remote locations is gaining increasing favor due to their small size, lightweightness, corrosion resistance, large bandwidth, and immunity to electromagnetic interference. In most applications, the conversion of electrical signals to light signals and vice versa, takes place in the transmitting and receiving units. Therefore, this type of arrangement requires optical fiber connectors to connect the optical fiber between the respective units. These optical fiber connectors are fairly expensive, require delicate handling, are comparatively inefficient in transferring the energy between the optical fibers and require relatively high expertise to install.

To eliminate the problems associated with these optical fiber connectors, Kaelin in U.S. Pat. No. 3,792,284, Logan in U.S. Pat. No. 4,294,512 and Inagaki et al in U.S. Pat. No. 4,316,204 teach embodying the electrooptic convertors in the connectors disposed at the opposite ends of the fiber optic cables so that the signals received by an output from the connectors are purely electrical signals. This same concept is also taught by Sone et al in U.K. Patent No. 2,099,254 and by Rohner et al in German Patent No. 3,048,512.

Chiron et al in U.S. Pat. No. 4,265,512 expands this concept to a connector for a multi-fiber fiber optic transmission cable. In the connector taught by Chiron et al, the connector has both electrical-to-light transducers and light-to-electrical signal transducers.

The invention is a hybrid connector cable system having particular use in communication, industrial, automotive, aerospace, and marine environments which eliminates the need for separate cables for transmitting information signals and electrical power for sensors and/or actuators.

SUMMARY OF THE INVENTION

The invention is a hybrid cable connector system for transmitting electrical power and infonnation signals between a control module and at least one device including at least one connector cable having a hybrid cable connected between an input connector and an output connector. The hybrid cable has at least one optical fiber and at least one metal conductor. The input connector has means for connecting the metal conductor to a source of electrical power and the output connector receiving the electrical power from the metal conductor. One of the input and output connectors has a light source for converting electrical information signals to light information signals and the other of the input and output connectors has a photodetector for converting the light information signals to electrical information signals. The light information signals are transmitted from the light source to the photodetector by at least one optical fiber. The hybrid cable connector system may also have at least one cable interface module connected between the output connector and a device. The cable interface module has means for transferring an electrical information signal between the device and the connector cable and for supplying electrical power from the output connector to the device.

In the preferred embodiment, the connector cable has two optical fibers each having a light source at one end and a photodetector at the other which permits information to be transferred in both directions through the connector cable. The preferred embodiment also contemplates the transmission by the optical fibers of a plurality of information signals multiplexed together. Therefore, the cable interface module will include a demultiplexer for extracting from the multiplexed information signal a predetermined signal to be used by the device connected to the cable interface module. The cable interface module may also include a multiplexer for adding a signal received from an external source, such as a sensor, to the multiplexed signal being transmitted by the hybrid connector cable.

The object of the invention is to provide a cable connector system using optical fibers in which fiber-to-fiber optical connections are eliminated. Another object of the invention is to eliminate the need for separate wire and fiber optic connectors at each actuator or sensor. Still another object of the invention is to provide a cable connector system which is relatively immune to corrosion and electromagnetic interference for use in communication, industrial, automotive, aerospace and marine applications. These and other objects of the invention will become more apparent from the reading of the specification in conjunction with the drawings.

DETAILED DESCRIPTION OF THE PREFERRED EMBODIMENT

Figure 1:
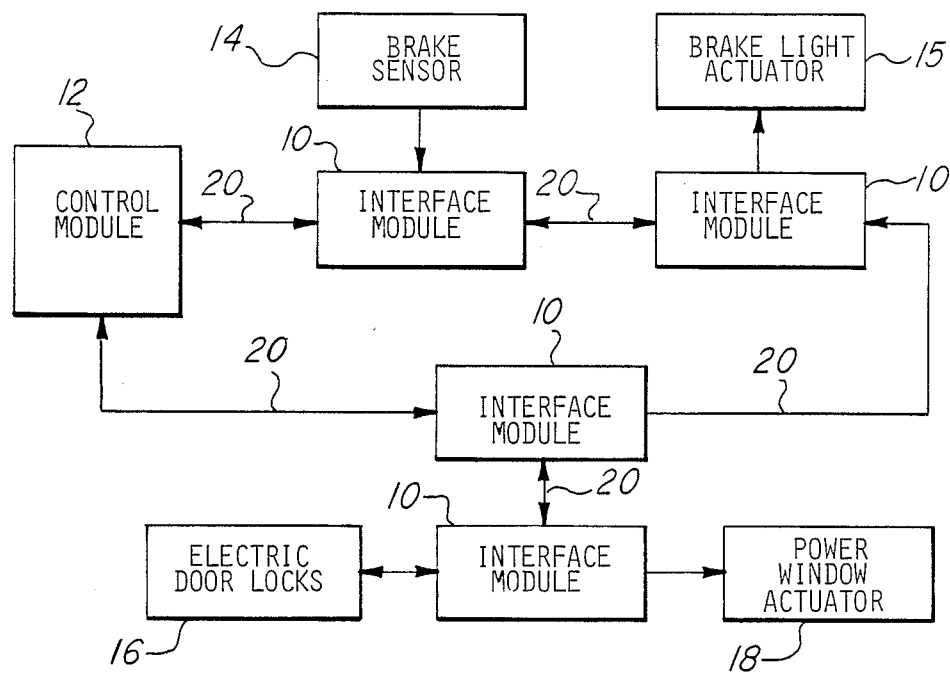
FIG. 1 is a block diagram showing a typical application of the hybrid connector cable system in an automotive application.
Figure 2:
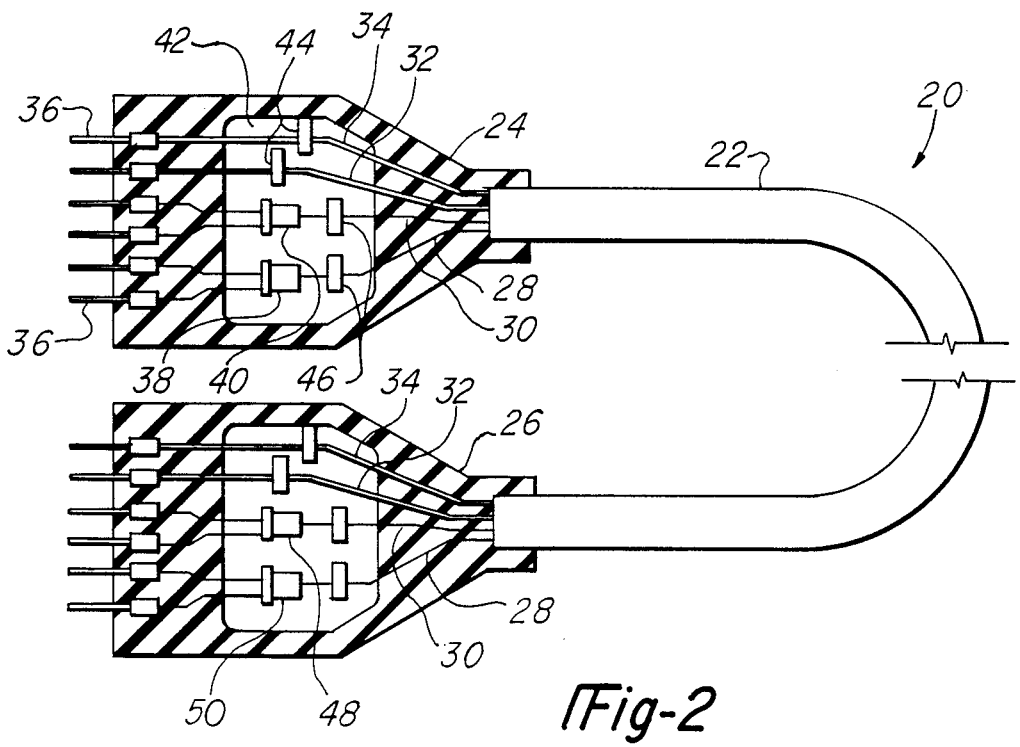
FIG. 2 is a partial cross-section of the connector cable showing the details of the input and output connectors.

In the connector cable system for an automotive vehicle shown in FIG. 1, a plurality of devices, such as a brake sensor 14, brake light actuator 15, electric door locks 16, and electric power window actuators 18, are connected to each other and to a control module 12 by means of connector cables 20 and cable interface modules 10. As shown in FIG. 2, each connector cable 20 includes a hybrid cable 22 having an input connector 24 provided at one end and an output connector 26 provided at the other end. The hybrid cable 22 embodies at least one optical fiber 28 and at least one metal conductor 32. In the preferred embodiment the hybrid cable 22 will have a second optical fiber 30 and a second metal conductor 34 which may function as a ground wire or the conductor for a regulated voltage as desired.

The connectors 24 and 26 are preferably made from a structural plastic material injection molded onto the ends of the hybrid cable 22. The input connector 24 has a plurality of connector pins 36 provided at the end thereof. The connector pins 36 may be disposed along a line as shown in FIG. 2, may be disposed along two or more lines, or may be disposed in a circle or any pattern as desired for a given application. The two electrical leads of a photodetector 38 for converting a light signal to an electrical signal, such as a photodiode or phototransistor, are electrically connected to a first pair of connector pins 36, while the two electrical leads of a light source 40 for converting an electrical signal to a light signal, such as a light emitting or laser diode or any other device for generating a light signal, are electrically connected to a second pair of connector pins 36. Each of the metal conductors 32 and 34 are connected directly to a separate connector pin 36.

The leads from the photodetector 38 and the light source 40 as well as the two metal conductors 32 and 34 are electrically connected to the conductor pins 36 using any of the conventional methods known in the art. They may be crimped, soldered, or welded to make a mechanically strong electrical connection.

The photodetector 38 and the light source 40 are mounted on a component board 42 to prevent their displacement during the injection molding of the connector 24. The component board 42 also has provisions for retaining wire clamps 44 for positioning the metal conductors 32 and 34 relative to their respective connector pins 36, and fiber clamps 46 for positioning the optical fibers 28 and 30 relative to the photodetector 38 and light source 40, respectively.

The structure of the output connector 26 attached to the other end of the hybrid cable 22 is identical to the structure of the input connector 24 discussed above, except that at this end of the fiber optic cable 22, a photodetector 48 is optically connected to the optical fiber 30 and a light source 50 is optically connected to the optical fiber 28. In this manner, each optical fiber has a light source disposed at one end and a photodetector disposed at the other end.

Figure 3:
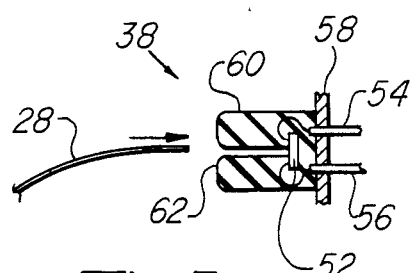
FIG. 3 is a cross-sectional view of a photodetector.

The structure of the photodetector 38 is shown in FIG. 3. The photodetector 38 has a solid-state photodetector element 52, such as a photodiode or phototransistor, the electrical leads of which are connected to a pair of pins 54 and 56 protruding from an insulator base 58. The photodetector element 52 is encapsulated in a plastic housing 60 which is transparent to the received light signal. The housing 60 also supports the photodetector element 52 relative to the insulator base 58. An aperture 62 is provided in the plastic housing 60 directly in line with the sensitive area of the photodetector element 52. The aperture 62 receives and positions the end of the optical fiber 28 adjacent to the photosensitive area of the photodetector element 52. The optical fiber 28 may be glued or cemented in the aperture 62 to hold it in place during the extrusion molding of the input connector 24.

Preferably, a thin layer of the transparent plastic used in the fabrication of the plastic housing 60 is left at the bottom of aperture 62 to cover the photosensitive area of the photodetector element 52 and protect it from abrasion by the end of the optical fiber 28.

The structure of the light sources such as the light emitting or laser diodes 40 and 50 are similar to the structure of the photodetector 38 shown in FIG. 3 except that the photodetector element 52 is replaced by a light emitting element. The light source 40 generates a light signal which is transmitted by the optical fiber 30 to the output connector 26 where it is received by the photodetector 48. In a like manner, the light source 50 generates a light signal which is transmitted by the optical fiber 28 to the input connector 24 where it is received by the photodetector 38. The structure of the photodetector 48 in the output connector 26 is the same as the photodetector 38 illustrated in FIG. 3.

Figure 4:
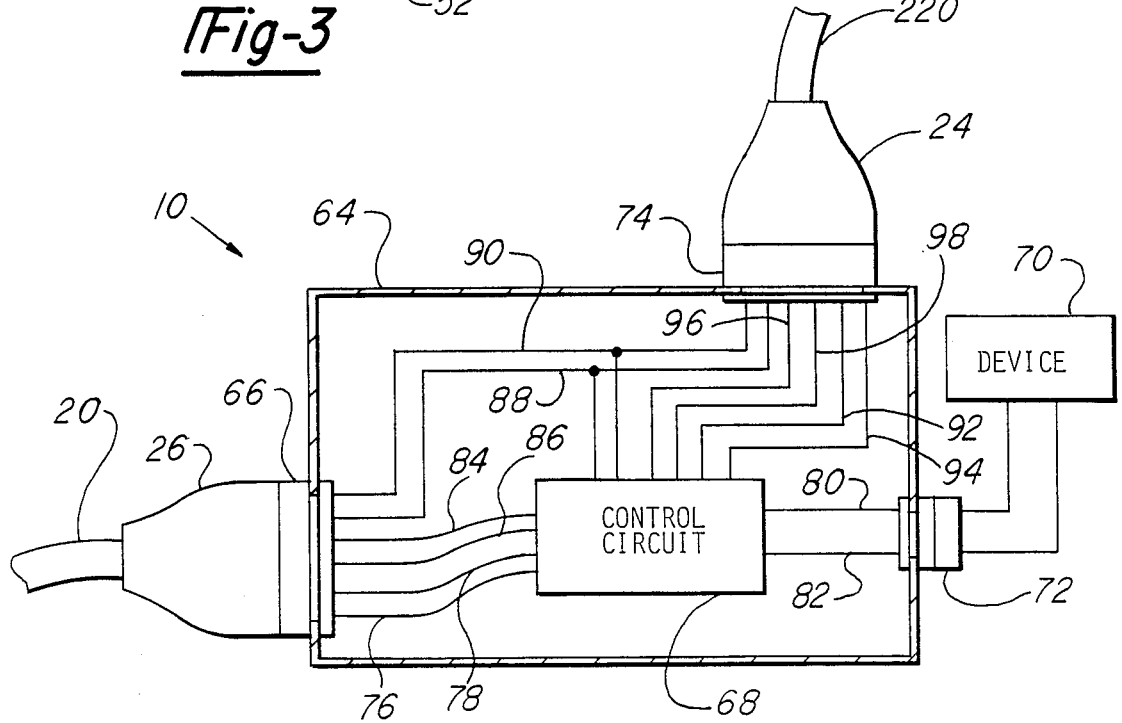
FIG. 4 is a block diagram showing the wiring interconnections of the cable interface module.

The details of the typical cable interface module 10 are shown in FIG. 4. The cable interface module 10 includes a housing 64 having at least a female input connector 66 adapted to receive the output connector 26 of the connector cable 20, a control circuit 68 connected to one or more devices 70, such as a sensor or actuator, through a feed-through or accessory connector 72. For most applications the cable interface module 10 will also have one or more female output connectors 74 for connecting the cable interface module with another cable interface module 10 by means of a continuing or second cable connector 220. The continuing connector cable 220 for all practical purposes is identical to the first connector cable 20. For other applications, the cable interface module 10 may be a terminal device and not have a female output connector 74. In a like manner, the control circuit 68 may be connected to two or more devices 70, for example, a single cable interface module 10 in the door of an automotive vehicle may control the operation of electric door locks and power window actuators as shown in FIG. 1.

The control circuit 68 receives the electrical information signals generated by the photodetector 48 in the output connector 26 via leads 84 and 86 and generate output signals on leads 80 and 82 actuating the device 70 when the device 70 is an actuator. In a like manner, the control circuit 68 will generate signals on leads 76 and 78 actuating the light emitting diode 50 in the output connector 26 to transmit corresponding light information signals through the optical fiber 30 in response to the signal generated by the device 70 when the device 70 is a sensor. The control circuit 68 also receives electrical power from the metal conductors 32 and 34 embodied in the connector cable 20 via leads 88 and 90. The leads 88 and 90 are also directly connected to the metal conductors in the continuing cable connector 220 through the female output connector 74.

In the preferred embodiment of the hybrid cable connector system the signals transmitted through the optical fibers 28 and 30 of the cable 20 are multiplexed so that each optical fiber is capable of transmitting a plurality of signals required for the operation of the system. This eliminates the need for having individual optical fibers for each sensor or actuator. This, however, also requires that the signals received on the leads 84 and 86 from the connector cable 20 must be relayed to the continuing connector cable 220. Therefore, the control circuit 68 includes means for amplifying the electrical signals received from the connector cable 20 and applying these amplified electrical signals to the light emitting diode 40 in the input connector 24 of the connector cable 220 via leads 92 and 94. In a like manner, the control circuit 68 will amplify the electrical signals received from the photodetector 38 in the continuing connector cable 220 on leads 96 and 98 and apply these amplified electrical signals to the light emitting diode 50 in the output connector 26 of the connector cable 20 via the leads 76 and 78. The control circuit will also have means for demultiplexing the received multiplexed signal to extract the signal of its associated device and means for multiplexing the signal generated by the associated device when it is a sensor with the other signals so that they can be transmitted back to the control module 12.

Figure 5:
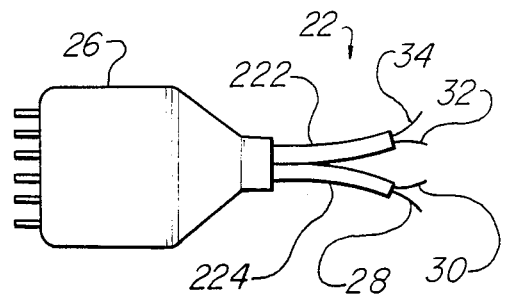
FIG. 5 is an alternate embodiment of the cable connector.

In an alternate embodiment shown in FIG. 5, the hybrid cable 22 may consist of two separate cables 222 and 224, the opposite ends of which terminate in single connectors, such as input and output connectors 24 and 26 shown in FIG. 2. As illustrated, the cable 222 embodies the metal wire conductors 32 and 34 while the cable 224 embodies the optical fibers 28 and 30. Alternatively, the cables 222 and 224 may be hybrid cables having both metal wires and optical fibers. The invention is not limited to a single hybrid cable, such as hybrid cable 22 shown in FIG. 2, but also embodies the concept of using two or more cables which terminate in single connectors at their opposite ends.

Figure 6:
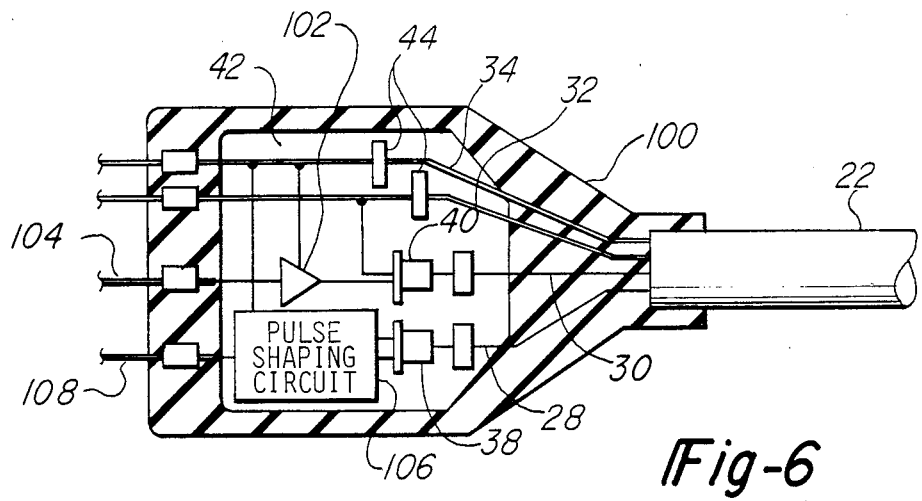
FIG. 6 is an alternate embodiment of the connectors embodying amplifiers and pulse shaping electronics.

In another alternate embodiment, driver amplifiers and the pulse shaping circuits may be embodied in the input and output connectors of the connector cable 20. FIG. 6 shows the structure of an input connector 100 of the alternate embodiment in which a driver amplifier 102 is connected between the light emitting diode 40 and a signal input connector pin 104. In a like manner, a pulse shaping (PS) circuit 106 is connected between the photodetector 38 and a signal output connector pin 108. The input connector 100 may also contain a voltage regulator (not shown) for supplying electrical power to the driver amplifier 102 and the pulse shaping circuit 106. Alternatively, the regulated voltage may be received from a voltage regulator in the control circuit 68 through a separate connector pin provided for that purpose, or receive electrical power directly from the metal conductor 32 as shown. The structure of the output connector of the connector cable 20 of the alternate embodiment is the same as the output connector 26 with the driver amplifier 102 connected between the light emitting diode 50 and its associated connector pin and the pulse shaping circuit 106 connected between the photodetector 48 and its associated connector pin.

The operation of the alternate embodiment of the hybrid cable connector system is the same as the preferred embodiment shown in FIGS. 2 through 4 and need not be repeated for an understanding of the invention.

The advantages of the hybrid fiber optic connector system are:

1. The hybrid optic connector system eliminates the need for optical fiber-to-optical fiber connections;
2. The system is relatively immune to electromagnetic interference;
3. The system does not generate electromagnetic interference;
4. The optical fibers are lightweight and highly resistant to erosion and corrosion;
5. The dual optical fiber system has a built-in redundancy which makes it more reliable than conventional wiring systems;
6. The hybrid cable system eliminates the need for a separate optical fiber and a separate metal wire connector when both are connected to a common device. This reduces bulkiness, material cost, assembly labor, and complexity;
7. The terminated fibers in the connector are relatively free of becoming contaminated due to handling; and
8. The hybrid connector allows for significant lower cost than separate optical and electrical connectors.

It is not intended that the invention be limited to the specific embodiments of the hybrid connection cable system shown in the drawings and described in the specification. It is recognized that those skilled in the art will be capable of making changes without departing from the spirit of the invention as described above and set forth in the appended claims.

What is claimed is:

1. A hybrid connector cable system for an automotive vehicle having a plurality of sensors generating sensor signals and a plurality of actuators responsive to actuator signals, comprising:

a control module for receiving said sensor signals and for generating actuator signals containing operating instructions for each of said plurality of actuators, said sensor signals and said actuator signals being multiplexed together to generate a multiplexed signal;

a plurality of actuator interface modules, one associated with at least one of said plurality of actuators, each of said actuator interface modules having a control circuit for extracting from said multiplexed signal the actuator signals for the actuator associated with that particular actuator interface module;

a plurality of sensor interface modules, each associated with at least one of said plurality of sensors, each of said sensor interface modules having a control circuit for adding the sensor signal generated by its associated sensor to said multiplexed signal; and a plurality of hybrid connector cables serially connecting said sensor and actuator interface modules with each other and with said control module, each of said hybrid connector cables having means for optically transmitting said multiplexed signals and means for supplying electrical power to said sensor and actuator interface modules.

2. The hybrid connector cable system of claim 1, wherein each of said hybrid connector cables comprises:

a length of a hybrid cable having at least a first optical fiber for transmitting optical signals and a first metal wire for conducting electrical power;

an input connector disposed at one end of said hybrid cable, said input connector having light source means for converting said multiplexed signal from an electrical multiplexed signal to a first optical multiplexed signal transmitted by said first optical fiber and an input terminal connected to said first metal wire for receiving electrical power; and an output connector disposed at the other end of said hybrid cable, said output connector having photodetector means for converting said first optical multiplexed signal transmitted by said first optical fiber to said electrical multiplexed signal, and an output terminal connected to said first metal wire for supplying electrical power to said sensor interface module and said actuator interface module to which it is connected.

3. The hybrid connector cable system of claim 2 wherein said hybrid cable has a second optical fiber, said output connector has light source means for generating a second optical signal transmitted by said second optical fiber and said input connector has a photodetector means converting said second optical signal to an electrical signal.

4. The hybrid cable connector system of claim 2 wherein each of said input and said output connectors has pulse shaping means for pulse shaping the output of said photodetector means to produce a multiplexed signal having clean square shaped pulses and driver amplifier means for amplifying said multiplexed signal to increase the power of said multiplexed signal actuating said light source means.

5. The hybrid cable connector system of claim 3 wherein each of said plurality of interface modules has means for transferring the electrical power and said multiplexed signals received from one of said plurality of connector cables connected thereto to a different one of said plurality of connector cables connected thereto.

6. The hybrid cable connector system of claim 5 wherein said means for transferring said multiplexed signal includes amplifier means for amplifying said multiplexed signal prior to being transferred to said different one of said plurality of connector cables.

7. The hybrid connector system of claim 6 having a connector cable connecting the last of said interface modules to said control module to provide a closed-loop for said multiplexed signal.

8. A cable connector system for transmitting information and electrical power between a plurality of devices comprising:

a control module having means for receiving and means for generating electrical multiplexed information signals;

a plurality of interface modules, each interfacing with at least one of said plurality of devices; and a plurality of connector cables serially connecting each of said plurality of interface modules with each other and with said control module, each of said connector cables having a hybrid cable connecting an input connector with an output connector, said hybrid cable having at least two optical fibers and at least one metal conductor, said input connector having an input terminal receiving electrical power connected to said at least one metal conductor, a light source for converting said electrical multiplexed information signals to light signals transmitted by one of said at least two optical fibers to said output connector and a photodetector for converting the light signals received from the other of said at least two optical fibers to electrical multiplexed information signals and said output connector having an output terminal connected to said at least one metal conductor, a photodetector for converting the light signals received from said one of said at least two optical fibers to said electrical multiplexed information signals and a light source for converting said electrical multiplexed information signals to light signals transmitted to said input connector through said other optical fiber;

wherein each of said plurality of interface modules has means for transferring said electrical power received from said at least one metal conductor of a first connector cable connected thereto and said electrical multiplexed information signals received from the output connector of said first cable connector to the input connector of a second cable connector connected thereto, means for extracting from said electrical multiplexed information signal an associated electrical information signal generated by said control module for the device interfaced by said interface module, and means for transferring said associated electrical information signal to said associated device.

9. The cable connector system of claim 8 wherein at least one of said plurality of devices is an actuator.

10. The cable connector system of claim 9 wherein another one of said plurality of devices is a sensor operative to generate a sensor signal, said interface module further comprising multiplexer means for multiplexing said sensor signal with said electrical multiplexed information signal and means for transmitting said electrical multiplexed information signal to said light source in said output connector of said first cable connector and to said light source in said input connector of said second cable connector.

11. The cable connector system of claim 8 wherein each of said input and output connectors has a pulse shaping circuit connected to said photodetector for producing a clean square pulse signal in response to the output of said photodetector and a driver amplifier for increasing the power of said electrical multiplexed information signals actuating said light source.

* * * * *

UNITED STATES PATENT AND TRADEMARK OFFICE
CERTIFICATE OF CORRECTION

PATENT NO. : 4,767,168
DATED : August 30, 1988
INVENTOR(S) : Mark E. Grandy

It is certified that error appears in the above-identified patent and that said Letters Patent is hereby corrected as shown below:

Column 1, line 50, delete "infonmation" and insert ---- information ----.

Column 3, line 34, delete "22," and insert ---- 22 ----.

Signed and Sealed this

Fourteenth Day of February, 1989

Attest:

DONALD J. QUIGG

*Attesting Officer*        *Commissioner of Patents and Trademarks*